United States Patent [19]
Okitsu

[11] Patent Number: 5,715,007
[45] Date of Patent: Feb. 3, 1998

[54] IMAGE DECODER WITH BLOCK IMAGE SHIFTING DEVICE

[75] Inventor: Hiromi Okitsu, Hamamatsu, Japan

[73] Assignee: Yamaha Corporation, Hamamatsu, Japan

[21] Appl. No.: 596,504

[22] Filed: Feb. 5, 1996

[30] Foreign Application Priority Data

Feb. 9, 1995 [JP] Japan ................................. 7-044929

[51] Int. Cl.$^6$ ............................................ H04N 7/36
[52] U.S. Cl. ........................................ 348/416; 348/420
[58] Field of Search ........................... 348/384, 390, 348/401, 402, 409, 412, 413, 415, 416, 420, 699; 382/283, 192; 345/191

[56] References Cited

U.S. PATENT DOCUMENTS

| | | | |
|---|---|---|---|
| 4,307,420 | 12/1981 | Ninomiya et al. | 348/413 |
| 5,276,800 | 1/1994 | Wada | 345/191 |
| 5,430,464 | 7/1995 | Lumelsky | 345/191 |

*Primary Examiner*—Amelia Au
*Attorney, Agent, or Firm*—Loeb & Loeb LLP

[57] ABSTRACT

An image decoder with a block image shifting device used for a movement compensating process in an image compression encoding/decoding system shifts image blocks each consisting of n×m pixels at a high speed in units of n pixels without using n to 1 selector circuits. When a movement compensation is carried out in each image block, a register stores a shift pixel number based on a movement vector. The image information read from a frame memory in units of n pixels is stored into a block buffer with selected bits masked by a mask pattern generating device in accordance with the shift pixel number to store unmasked bits into the block buffer. When reading the pixel data from the block buffer, the pixels are shifted according to a read address and the shift pixel number used to store the pixels into the block buffer. As a result, the output data from the block buffer is movement compensated without the use of the n to 1 selector circuits.

6 Claims, 5 Drawing Sheets

5,715,007

1

IMAGE DECODER WITH BLOCK IMAGE SHIFTING DEVICE

BACKGROUND OF THE INVENTION

1. Field of the Invention

This invention relates to an image decoder with a block image shifting device used for a movement compensating process in image compression encoding/decoding system standards, such as H. 261, Moving Picture Coding Experts Group (MPEG) 1 or 2.

2. Related Art

With the progress in digital communication networks and information storage media technology, various digital picture compression system standards, such as H. 261, MPEG 1 and MPEG 2, have been proposed. An encoded bit stream in these systems is formed with a six-hierarchy structure, which includes sequence layers, GOP (Group of Picture) layers, picture layer, slice layers, macro block layers and block layers, as shown in FIG. 4 (which illustrates the MPEG 1 standard). In MPEG 2, substantially the same hierarchy structure is also utilized, except that the GOP layers are optional, and that the picture layers therein have undefined arrangements. In a picture using the MPEG standard, image data for one picture frame must be encoded with regard to the previous and subsequent picture frame image data. Consequently, it is possible to carry out a random access of GOPs in which each GOP comprises several picture frame data lumped together.

A GOP is constructed, for example, by a combination of three kinds of pictures, I, P and B. Each picture corresponds to the image data for one picture frame. The pictures are classified depending upon the existence and direction of interframe prediction, as shown in FIG. 5. The I (Intra) picture is an intraframe encoded image, the P (Predictive) picture is an interframe forward predictive encoded image, and the B (Bidirectionally predictive) picture is an interframe bidirectionally predictive encoded image. In the interframe prediction, movement compensation prediction, which depends upon an amount of movement between frames (movement vector), is carried out. In the MPEG 2 standard, the image data may be handled in units of one field in place of one frame. Each picture is further divided into a plurality of slices, and each slice is divided into a plurality of macro blocks (MBs). Each macro block comprises four blocks (BKs) having a luminance signal (Y) and two BKs containing a color-difference signal (Cb, Cr). Each BK comprises 8×8 pixels (picture elements). The BK is the unit of DCT (Discrete Cosine Transform) in MPEGs. In MPEG 2, a different MB structure may be used depending on the profiles used.

In H. 261 or MPEGs 1 and 2, a movement vector is provided to every MBs, and the movement prediction is carried out in each MB. FIGS. 6 and 7, which show portions of a memory interface in CODEC (coder-decoder), are used to explain a block image shifting circuit as used in a movement compensating process. Since the movement vector in MPEGs is represented in units of ½ pixels, a fractional portion can be also calculated. In such a case, a group of 8 pixels is produced from a group of 9 pixels by interpolation and is used in subsequent processing. Although additional circuits are needed to the device shown in FIG. 6 to process more than one-pixel unit, the same description for the one-pixel unit described above and below are applicable to the device having more than one-pixel unit.

As shown in FIG. 6, one-frame image information of a color difference signal, which has been already decoded and

2 stored in a frame memory 1, is shifted by a shift pixel number SF based on the movement vector MV as the processing unit of a block (BK) of 8×8 pixels, and is loaded into a block buffer 2. The image information is written into the block buffer 2 in 8 pixel (=64 bits) units, and is read from the block buffer 2 in one pixel (=8 bits) unit. When the image information is written into the block buffer 2 from the frame memory 1, a data selector 3 having eight 8 to 1 selectors 31, 32, ..., 38, as shown in FIG. 7, causes the image information from the frame memory 1 to shift at a high speed. Since the number of n to 1 selectors needed to transfer data from the frame memory 1 to the block buffer is n for a high speed shift of a block having n×m pixels, the circuit size must increase in proportion to the number n.

SUMMARY OF THE DISCLOSURE

An object of this invention is to provide a block picture shifting device and image decoder which enable a high speed shifting of a block comprising n×m pixels in units of n picture elements without the use of data selectors.

A block image shifting device is operable with image information data stored in a frame memory. The image information data has a plurality of image blocks, in which each image block is formed of n×m pixels and is movement compensated according to a shift pixel number based on an interframe movement vector. The block image shifting device has a block buffer for storing each image block of the image information data stored in the frame memory, and a shift pixel number storing means for storing the shift pixel number. The block image shifting device further includes a read/write control means for controlling the transfer of the image information data from the frame memory to the block buffer and for outputting a movement compensated image signal from the block buffer. The image information data from the frame memory is read in units of n pixels with selected pixels masked based on the shift pixel number to store unmasked pixels into the block buffer. The movement compensated image signal outputted from the block buffer includes the image information data read in units of n pixels from the frame memory with a position of n pixels shifted in accordance with the shift pixel number. The read/write control means includes a mask pattern generating device responsive to the shift pixel number to mask the selected pixels read from the frame memory to store unmasked pixels into the block buffer. The read/write control means further includes a plurality of AND gates responsive to a write enable signal to mask the selected pixels read from the frame memory to store unmasked pixels into the block buffer.

An image decoder according to an embodiment of the present invention is operable with image information data having a plurality of image blocks, each image block formed of n×m pixels. The image information data is interframe-encoded with an interframe movement vector, and each image block is decoded and movement compensated based on the interframe movement vector. The image decoder includes a frame memory for storing the interframe-encoded image information of each picture frames, and a block image shifting device operable with image information data stored in a frame memory. Each image block of the image information data is movement compensated according to a shift pixel number based on the interframe movement vector. The block image shifting device includes all of the components stated above.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
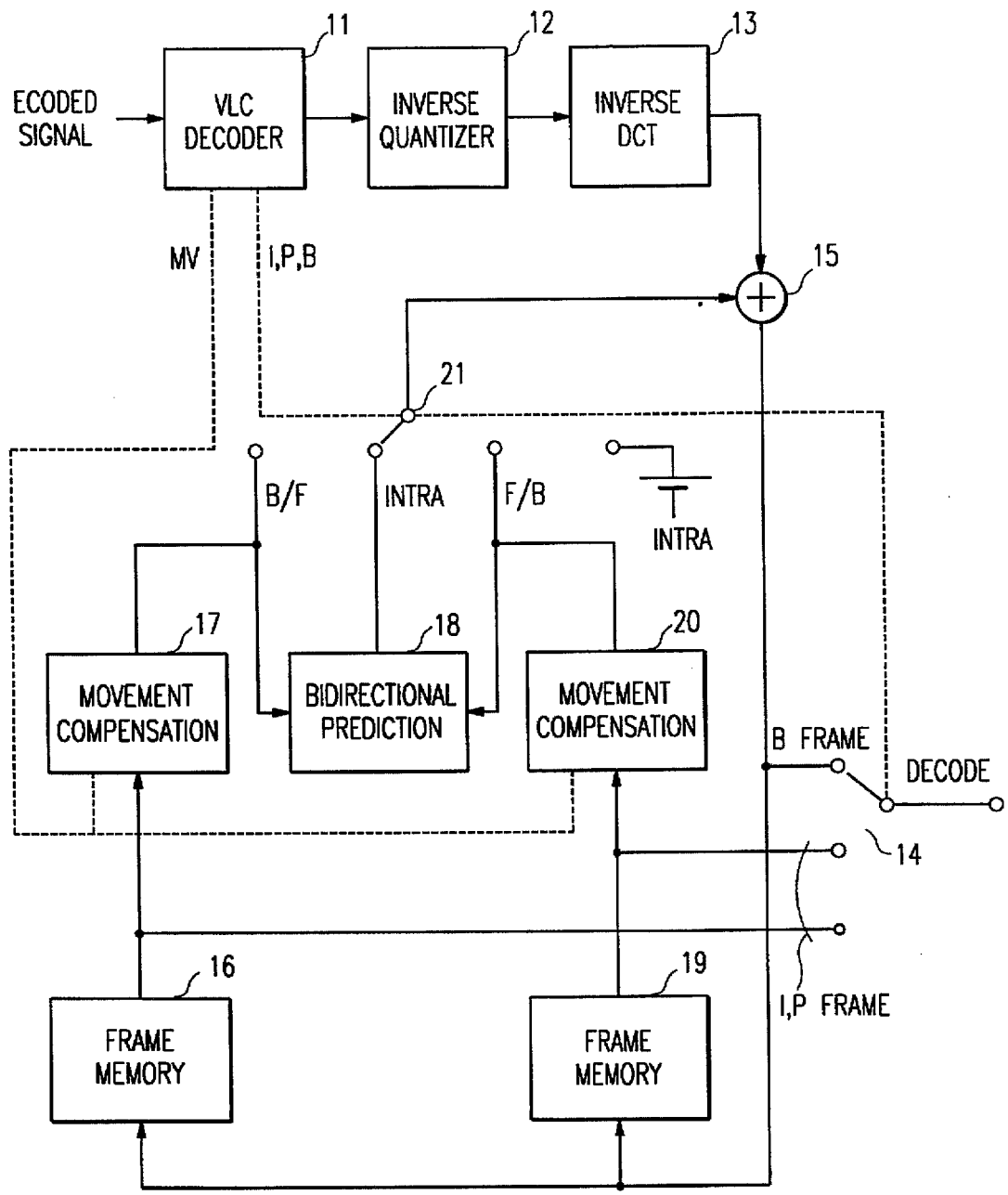
FIG. 1 is a block diagram of an MPEG image decoder according to one embodiment of the present invention.

A preferred embodiment of the present invention is explained with reference to the drawings. FIG. 1 is a block diagram of a picture decoder for MPEGs 1 and 2, according to an embodiment of the present invention. A bit stream (in an MPEG format) of an encoded signal read from a transmission system or a recording medium (not shown) is bit-rate adjusted in an input buffer (not shown). The bit stream is then variable-length decoded for each frame in a VLC (Variable Length Code) decoder 11, and inverse-quantized in an inverse quantizing device 12 with a value determined by quantization property and quantization matrix, to obtain a DC (Discrete Cosine) coefficient for each BK. The DC coefficient is inverse-cosine transformed in an inverse DCT (Discrete Cosine Transform) device 13. For an I picture, inverse-cosine transformed image information is outputted through a switch 14 as a decoded signal. For a P or B picture, an output signal from the inverse DCT device 13, which consists of a difference image, is added with a prediction image movement-compensated signal via an adder 15.

The decoded image information, which is stored in a frame memory 16 or 19, is used for forward/backward prediction in movement compensation prediction devices 17 and 20. The decoded image information is further used for bidirectional prediction in a bidirectional prediction device 18. A switch 21 controls the prediction directions in response to the inverse-DC-transformed pictures types.

Figure 2:
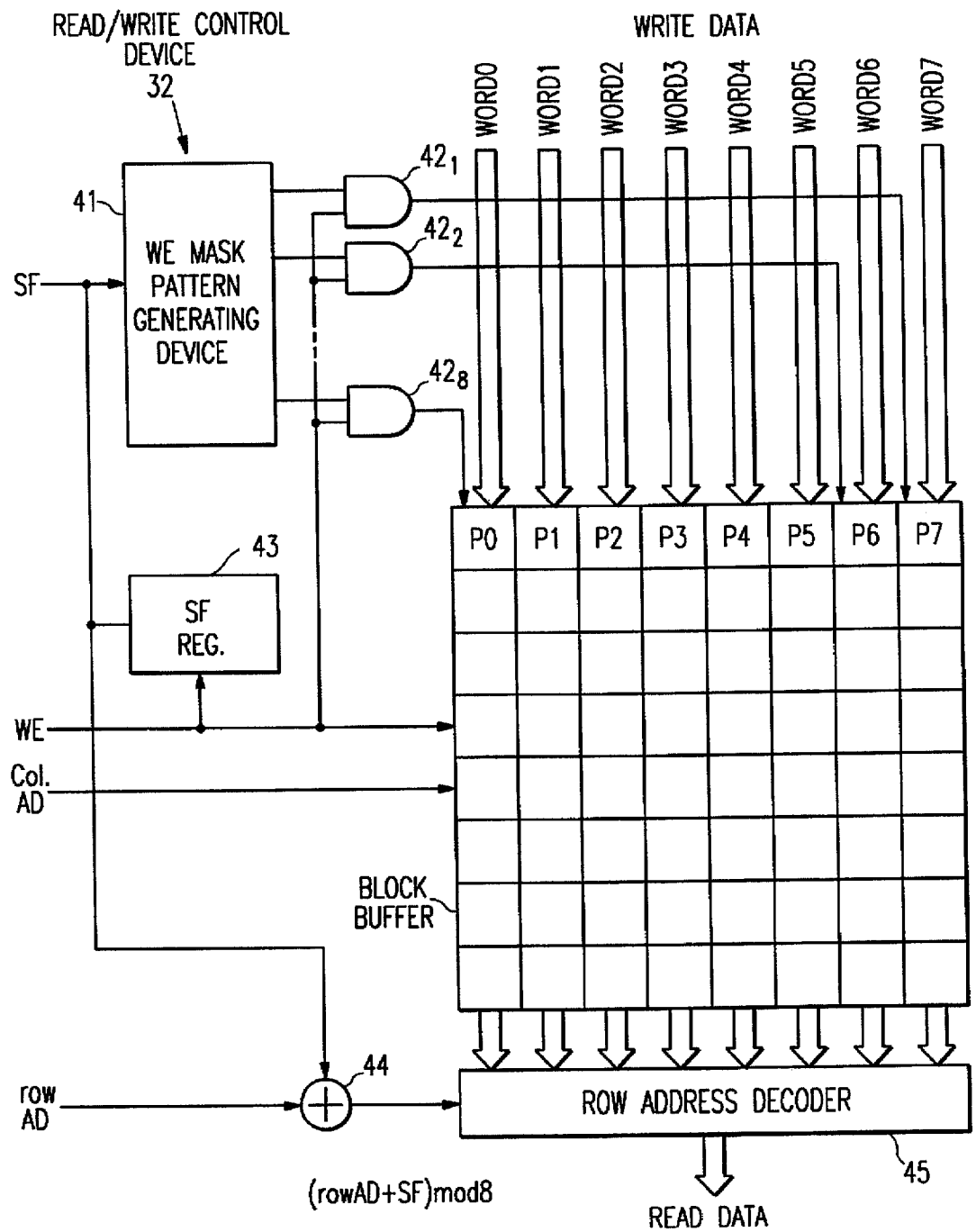
FIG. 2 is a block diagram of a block image shifting circuit of a movement compensation predicting device shown in FIG. 1.

FIG. 2 is a block diagram of a block image shifting circuit used in the movement compensation prediction devices 17 and 20. The bidirectional prediction device 18 is adapted to provide a prediction output average from the movement compensation prediction devices 17 and 20.

The block image shifting circuit of FIG. 2 comprises a block buffer 31 for storing image information consisting of BKs read from the frame memory 16, and a read/write control device 32 for controlling the read and write function of the block buffer 31. In an embodiment shown in FIG. 2, the buffer size of the block buffer 31 is set to 8×8 pixels. The pixels extending in the horizontal direction of the block buffer 31 is referred to as a "row," and the pixels extending in the vertical direction of the block buffer 31 is referred to as a "column." Each pixel constitutes, for example, one word (=8 bits). The image information, corresponding to one row comprising 8 words (=64 bits), is simultaneously read from the frame memory 16, and written into the block buffer 31.

A shift pixel number (SF) based on a movement vector MV is provided to a write enable (WE) mask pattern generating device 41. The WE mask pattern generating device 41 generates a mask pattern based on the shift pixel number to prevent the writing of certain pixels of the image information read from the frame memory into the block buffer 31. AND gates $42_1$, $42_2$, $42_8$, mask the WE signal provided to the block buffer 31 in accordance with the mask pattern to selectively write pixel data into the block buffer 31. The shift pixel number (SF) is stored in a shift pixel number register 43, until all of the columns in the block buffer 31 are accessed.

Figure 3:
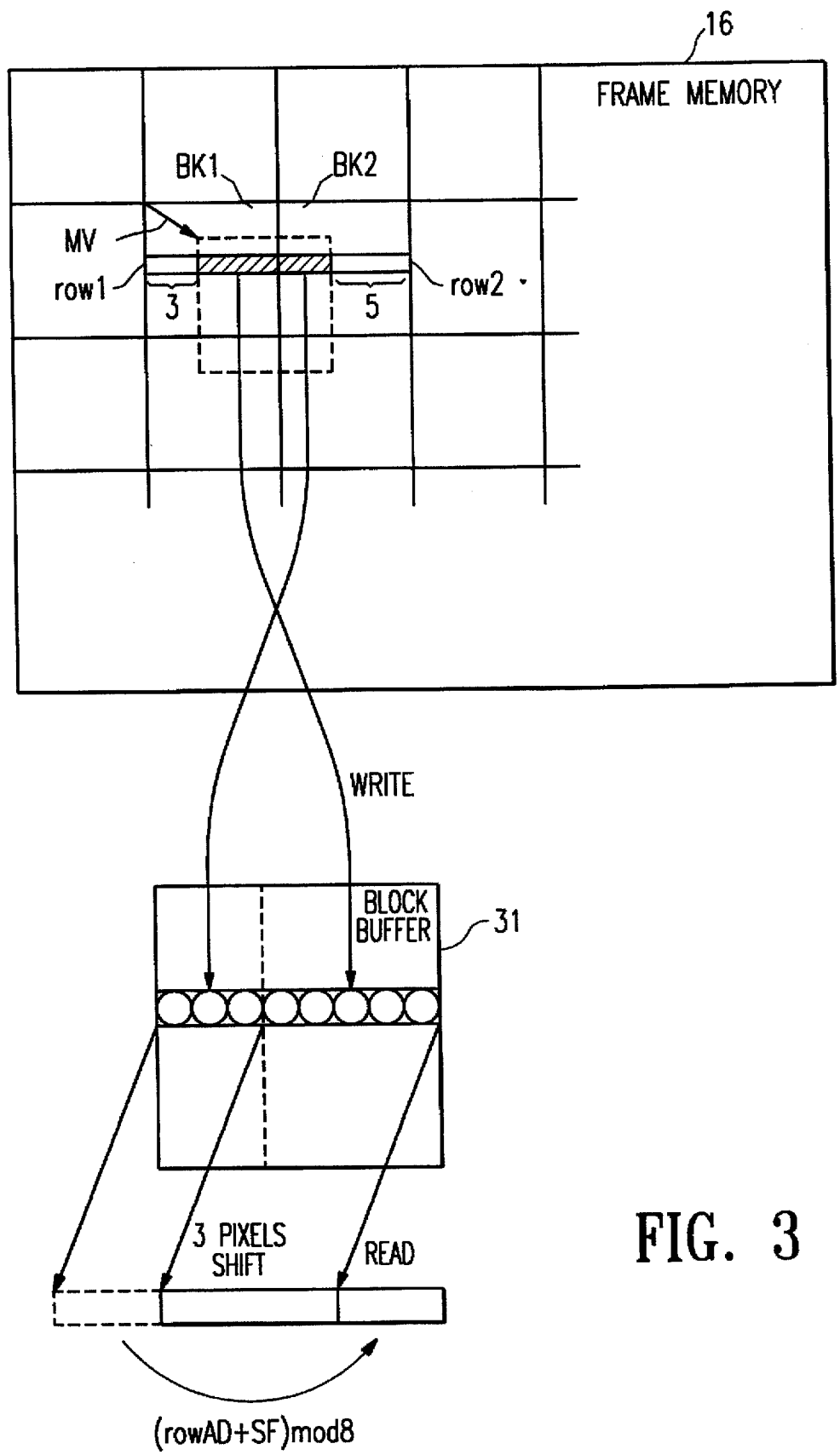
FIG. 3 shows an operation of the block image shifting circuit of FIG. 2.
Figure 4:
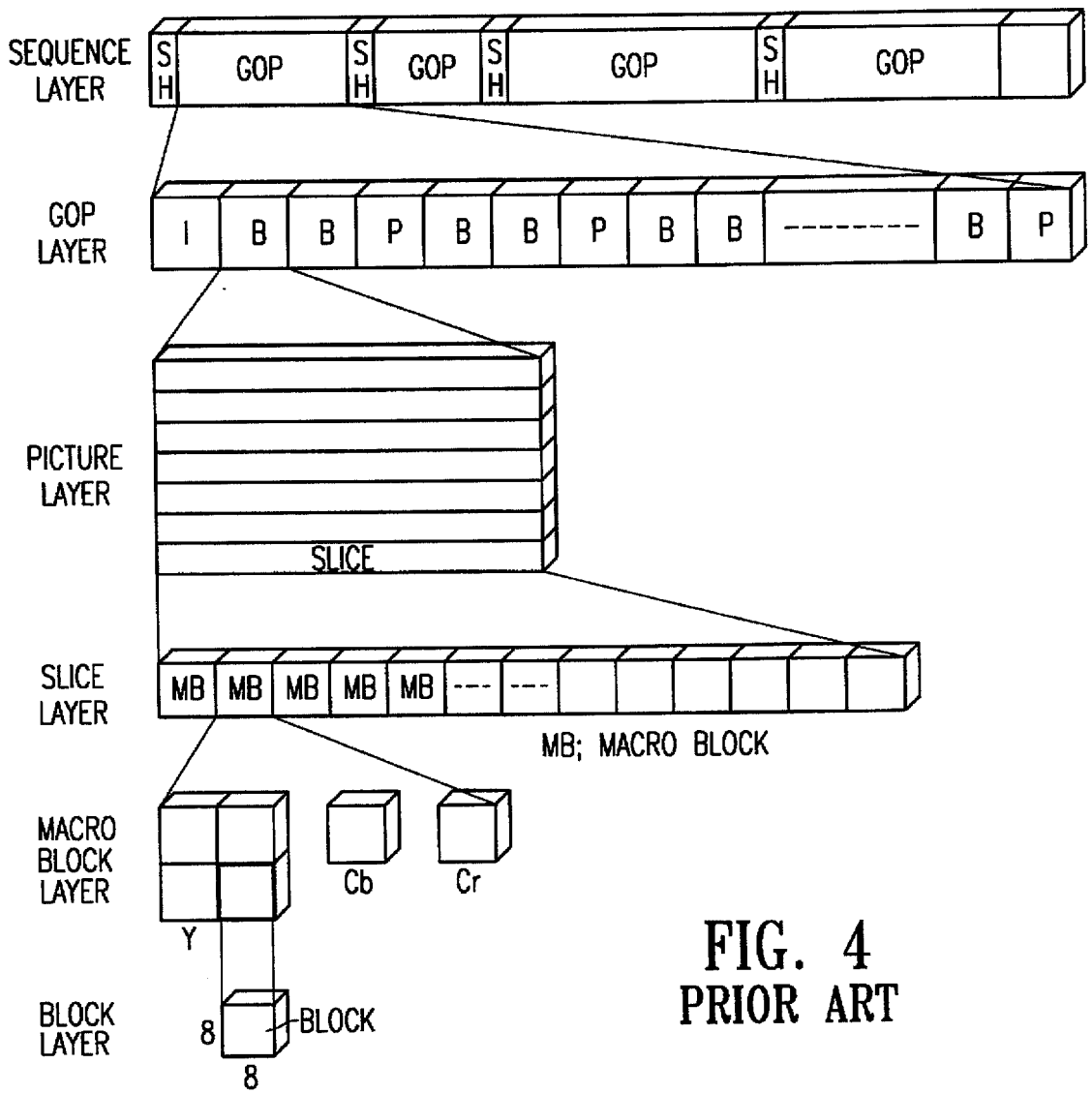
FIG. 4 is a data structure of MPEG data.
Figure 5:
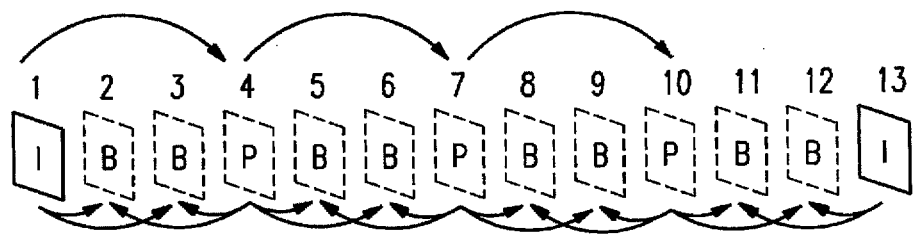
FIG. 5 is a picture type and predictive direction of MPEG data.
Figure 6:
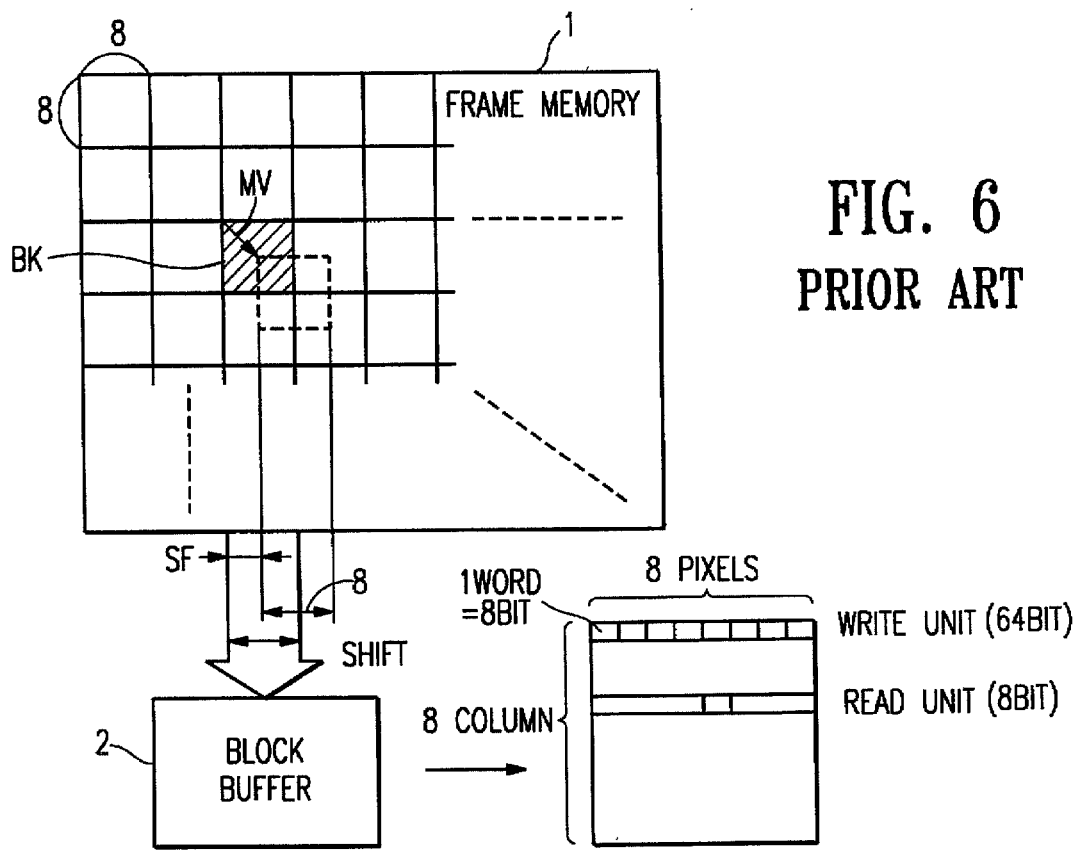
FIG. 6 is a prior art block image shifting circuit.
Figure 7:
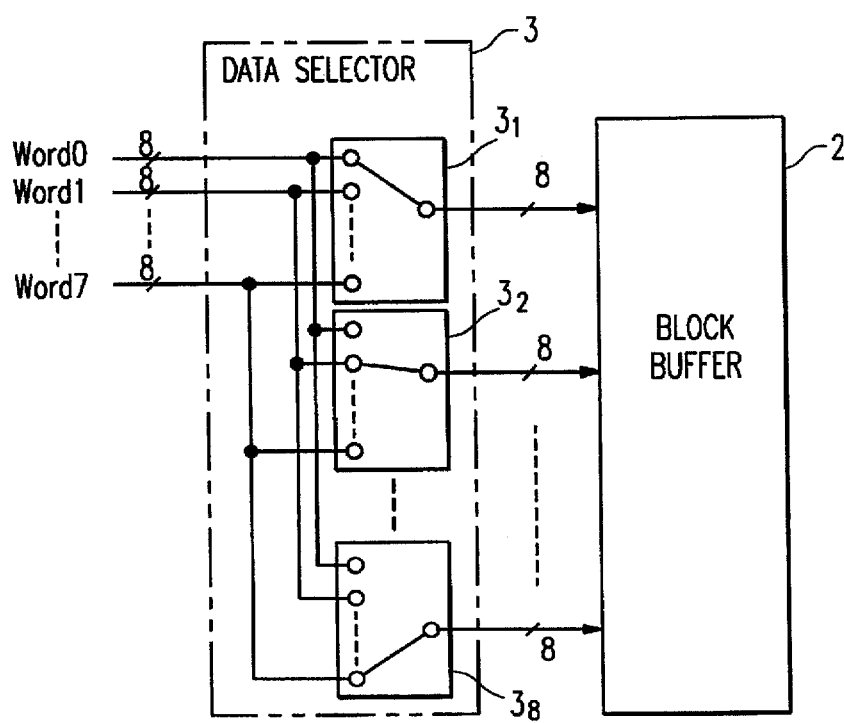
FIG. 7 is a block diagram of a data selector used in the block image shifting circuit of FIG. 6.

To read the image data in the block buffer 31, a row address for reading the pixel data is added to the shift pixel number stored in the shift pixel number register 43 via an adder 44 to provide an address for a row address decoder 45. The image information in a column selected by a column address signal, in conjunction with the row address, is read from the block buffer 31. The row address decoder 45 selects the pixel information from the selected address of the image information of one row, and outputs the pixel information. For example, if the right shift direction is selected and the shift pixel number SF is set to a number between −7 and +7, then the shift pixel number can be represented with 4 bits. When the LSB (least significant bit) is 0, a right aligned shift is made, and when the LSB is 1, a left aligned shift is made. FIG. 3 shows an example in which SF is equal to +3 (0011) based on the movement vector MV. In this case, the image information in BK1 and BK2 is written into the block buffer 31 from the frame memory 16. More specifically, 8 pixels of image information in row 1 of BK1 is read from the frame memory 16 and written into the block buffer 31. Since the shift pixel number SF is equal to +3 (0011), the 3 left pixels of the image information in row 1 are masked by the WE mask pattern and are prevented from being written into the block buffer 31.

Next, 8 pixels of image information in row 2 of BK2 and the same column as in BK1, is read from the frame memory 18, and is written into the block buffer 31 after bits are shifted according to the shift pixel number. The shift pixel number SF, is set by inverting the MSB (most significant bit) which results in SF=−5(1011). As a result, the 5 right pixels of the image information in row 2 are masked by the WE mask pattern and are prevented from being written into the block buffer 31. Therefore, as shown in FIG. 3, the image information is loaded into the block buffer 31 such that the 5 pixels from BK 1 are arranged on the right side and the 3 pixels from BK 2 are arranged on the left side. In these successive buffering processes, only the MSB of the shift pixel number SF may be changed in accordance with the write cycles to store data into the block buffer 31. The 3 lower order bits of the shift pixel number SF are stored in the shift pixel register 43 for use by the address decoder 45 (shown in FIG. 2).

When reading data from the block buffer 31, as shown in FIG. 3, a read address is shifted by 3 pixels by means of the adder 44. If the output bit number of the adder 44 is set to 3 bits the output of the adder 44 is represented as (row address +SF) mod 8. As a result, the position of the 5 right pixels and the 3 left pixels of the image information stored in the block buffer 31 are reversed. Consequently, the image information shifted by 3 pixels to the right direction is outputted.

Thus, the unshifted image information is written into the block buffer 31 by masking the pixel data from the frame memory 16 according to the shift pixel number. The image information subsequently read from the block buffer 31 is shifted by shifting a read address according to the same shift pixel number used to shift the stored pixels. Therefore, the preferred embodiment of the present invention does not need 8 to 1 selector circuits to perform a movement compensation. The absence of the 8 to 1 selector circuits allows the present invention to be constructed using less space.

In an alternative embodiment of the present invention, the size of the block buffer 31 may be of any macro block size of n×m pixels. Also, in the H. 261 or MPEG standard, since the image encoder includes as a local decoder the image decoder explained in connection with the above-mentioned embodiment, it is possible to use the image decoder according to this invention for this local decoder portion.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A block image shifting device operable with image information data stored in a frame memory, the image information data having a plurality of image blocks, in which each image block is formed of n×m pixels and is movement compensated according to a shift pixel number based on an interframe movement vector, where n and m are integers, the block image shifting device comprising:
   a block buffer for storing each image block of the image information data stored in the frame memory;
   shift pixel number storing means for storing the shift pixel number;
   read/write control means for controlling the transfer of the image information data from the frame memory to the block buffer and for outputting a movement compensated image signal from the block buffer, wherein the image information data from the frame memory is read in units of n pixels with selected pixels masked based on the shift pixel number to store unmasked pixels into the block buffer; and
   a row address decoder outputting the movement compensated image signal from the block buffer, the block buffer having the image information data read in units of n pixels from the frame memory with a position of n pixels shifted in accordance with the shift pixel number and a row address, wherein the movement compensated image signal includes pixels within the group of pixels rearranged based on the modulo 8 of the sum of the row address and the shift pixel number.

2. A block shifting image device according to claim 1, wherein the read/write control means includes a mask pattern generating device responsive to the shift pixel number to mask the selected pixels read from the frame memory to store unmasked pixels into the block buffer.

3. A block shifting image device according to claim 1, wherein the read/write control means further includes a plurality of AND gates responsive to a write enable signal to mask the selected pixels read from the frame memory to store unmasked pixels into the block buffer.

4. An image decoder operable with image information data having a plurality of image blocks, each image block formed of n×m pixels, in which the image information data is interframe-encoded with an interframe movement vector, and each image block is decoded and movement compensated based on the interframe movement vector, where n and m are integers, the image decoder comprising:
   a frame memory for storing the interframe-encoded image information of each picture frame; and
   a block image shifting device operable with image information data stored in a frame memory, each image block of the image information data being movement compensated according to a shift pixel number based on the interframe movement vector, the block image shifting device including,
      a block buffer for storing each image block of the image information data stored in the frame memory;
      shift pixel number storing means for storing the shift pixel number;
      read/write control means for controlling the transfer of the image information data from the frame memory to the block buffer and for outputting a movement compensated image signal from the block buffer, wherein the image information data from the frame memory is read in units of n pixels with selected pixels masked based on the shift pixel number to store unmasked pixels into the block buffer; and
      a row address decoder outputting the movement compensated image signal from the block buffer, the block buffer having the image information data read in units of n pixels from the frame memory with a position of n pixels shifted in accordance with the shift pixel number and a row address, wherein the movement compensated image signal includes pixels within the group of pixels rearranged based on the modulo 8 of the sum of the row address and the shift pixel number.

5. A block image shifting device operable with image information data stored in a frame memory, the image information data having a plurality of image blocks, in which each image block is formed of a plurality of pixels and is movement compensated according to a shift pixel number based on an interframe movement vector, the block image shifting device comprising:
   a block buffer for storing each image block of the image information data stored in the frame memory;
   a shift pixel number register that stores the shift pixel number;
   a control device responsive to the shift pixel number and a write enable signal, wherein a group of pixels in image information data from the frame memory to the block buffer is selectively masked by the control device to store unmasked pixels from the group of pixels into the block buffer;
   a row address decoder, responsive to the shift pixel number and a row address, that outputs a movement compensated image signal from the block buffer, wherein the movement compensated image signal includes pixels within the group of pixels rearranged based on the modulo 8 of the sum of the row address and the shift pixel number.

6. A block image shifting device according to claim 5, wherein the control device includes a mask pattern generating device that produces a mask pattern signal based on the shift pixel number, and a plurality of AND gates operable with the mask pattern signal and the write enable signal to mask the write enable signal to store selected pixels from the plurality of pixels of the image block into the block buffer.

* * * * *